(12) United States Patent
Kent

(10) Patent No.: US 10,653,983 B2
(45) Date of Patent: May 19, 2020

(54) CONNECTOR PIPE SCREEN

(71) Applicant: Bio Clean Environmental Services, Inc., Oceanside, CA (US)

(72) Inventor: Zachariha J. Kent, San Antonio, TX (US)

(73) Assignee: Bio Clean Environmental Services, Inc., Oceanside, CA (US)

( * ) Notice: Subject to any disclaimer, the term of this patent is extended or adjusted under 35 U.S.C. 154(b) by 7 days.

(21) Appl. No.: 15/956,714

(22) Filed: Apr. 18, 2018

(65) Prior Publication Data

US 2018/0304177 A1 Oct. 25, 2018

Related U.S. Application Data

(60) Provisional application No. 62/487,236, filed on Apr. 19, 2017.

(51) Int. Cl.
| | |
|---|---|
| *E03F 5/04* | (2006.01) |
| *B01D 35/02* | (2006.01) |
| *B01D 33/01* | (2006.01) |
| *E03F 5/10* | (2006.01) |
| *E03F 5/14* | (2006.01) |
| *B01D 29/03* | (2006.01) |
| *F16L 55/24* | (2006.01) |

(52) U.S. Cl.
CPC ........... *B01D 35/02* (2013.01); *B01D 29/035* (2013.01); *B01D 33/0166* (2013.01); *E03F 5/0404* (2013.01); *E03F 5/105* (2013.01); *E03F 5/14* (2013.01); *F16L 55/24* (2013.01)

(58) Field of Classification Search
CPC .......... E03F 5/0404; E03F 5/105; E03F 5/14; B01D 35/02
USPC .......................................... 210/170.03, 747.3
See application file for complete search history.

(56) References Cited

U.S. PATENT DOCUMENTS

| | | | | |
|---|---|---|---|---|
| 1,793,599 A | * | 2/1931 | Egan ....................... | E03F 5/046 210/170.03 |
| 5,405,539 A | * | 4/1995 | Schneider .............. | E03F 5/0404 210/170.03 |
| 5,643,445 A | * | 7/1997 | Billias ...................... | E03F 5/14 210/163 |
| 6,214,217 B1 | * | 4/2001 | Sliger, Jr. .............. | E04H 4/1272 210/167.19 |
| 6,338,595 B1 | | 1/2002 | Schollen | |
| 6,478,954 B1 | | 11/2002 | Turner et al. | |
| 7,276,156 B2 | * | 10/2007 | Lockerman .......... | E03F 5/0404 210/170.03 |
| 7,682,104 B2 | | 3/2010 | Wassman et al. | |
| 7,722,763 B2 | * | 5/2010 | Benty ................ | B01D 21/0012 210/170.03 |
| 8,017,004 B2 | * | 9/2011 | Crumpler .............. | E03F 5/0404 210/170.03 |
| 10,132,071 B1 | * | 11/2018 | Alvarado .............. | E03F 5/0404 |
| 2009/0152181 A1 | | 6/2009 | Happel et al. | |

(Continued)

*Primary Examiner* — Christopher Upton
(74) *Attorney, Agent, or Firm* — Steven W. Webb

(57) ABSTRACT

A frameless, modular connector pipe screen insert designed for installation within storm water infrastructure, including a catch basin, for the treatment of storm water by removing trash and debris from incoming water flow. The connector pipe screen is optimally designed with perforation sizes and void areas to remove trash and debris; thereby preventing further pollution of nearby water systems including rivers, lakes, and oceans.

8 Claims, 9 Drawing Sheets

(56) References Cited

U.S. PATENT DOCUMENTS

| | | | |
|---|---|---|---|
| 2013/0008842 A1* | 1/2013 | Jarvis, Jr. .............. | E03F 5/0404 |
| | | | 210/499 |
| 2013/0008851 A1* | 1/2013 | Jarvis, Jr. .............. | E03F 5/0404 |
| | | | 210/499 |
| 2015/0259896 A1* | 9/2015 | Jarvis ........................ | E03F 5/14 |
| | | | 210/131 |

* cited by examiner

CONNECTOR PIPE SCREEN

CROSS-REFERENCE TO RELATED APPLICATION(S)

The present application is a non-provisional conversion of U.S. Provisional Patent Application No. 62/487,236 filed on Apr. 19, 2017. This referenced application, including the drawings, is specifically incorporated by reference herein in entirety for all it discloses and teaches and for all purposes.

FIELD OF THE INVENTION

The embodiments of the present technology relate, in general, to trash and debris capture screens implemented into storm water drainage infrastructure system and methods of using the same. Although the present invention is primarily described in context of installation within a catch basin, the invention is not so limited.

BACKGROUND AND PRIOR ART

Trash capture devices implemented into storm water drainage infrastructure have been around for decades. In the early 2000s cities in the Los Angeles, Calif. U.S.A. area started experimenting with what was come to be known as connector pipe screens, herein referred to generally as "CPS devices". CPS devices were designed for installation inside storm water catch basins. CPS devices are made of perforated stainless steel or other related materials. The screens were placed around the outlet pipe of the catch basin to prevent trash from leaving the catch basin via the outlet pipe. Accumulated trash and debris could later be removed from the catch basin.

CPS devices have proven to be an effective and feasible way of preventing trash, organic matter such as leaves, and other debris from traveling through drainage infrastructure and exiting into the nation's oceans, lakes and streams where it causes damage to the environment. Unlike CPS devices known in the art, the presented invention is an innovative method and engineering of a connector pipe screen utilizing a single material to reduce costs, prevent waste material, increase strength and weight capacity, allows for easy assembly, and has a removable center piece to allow for jetting of the outlet pipe without removing the entire system.

In the early 2000s the EPA and California Regional Water Quality Boards issued what is known as a Total Maximum Daily Load (TMDL) for trash in the Los Angeles Region, specifically the Los Angeles River Watershed. Countless studies were conducted on the river and its discharge into the Pacific Ocean to measure the effectiveness of TMDL regulations. It was discovered that trash and debris entering the river basin from storm water infrastructure far exceeded acceptable levels. The trend to identify solutions to this problem were further promulgated by several environmental groups advocating for action to be taken to reduce the amount of trash discharged into the river and other watersheds.

Once TMDL standards were implemented, cities became accountable for what was exiting their storm water drainage infrastructure. Reduction benchmarks were mandated and over the coming years cities and counties would need to prove that the trash load leaving their storm water pipes and channels was decreasing. TMDL standards were come to be known as the LA Region Full Capture Trash TMDL. It was called Full Capture TMDL because the requirement stipulated that a device would have to remove 100 percent of trash and debris down to 5.0 mm in size at a specific flow rate equal to a 1-year, 1-hour storm prediction. It was determined this size storm could provide treatment of over 90 percent of the average annual rainfall. The 5.0 mm screen perforation size of a CPS device was chosen as a regulated size because 5.0 mm is slightly smaller than the size of a cigarette butt.

It is known in the art that the CPS device was originally invented by the City of Los Angeles. Several designs and configuration were tested and implemented. The designs initially started as flat horizontal screens. One problem discovered with the implementation of flat screens is the increased surface area subject to the direct flow of incoming water weakens the integrity of a CPS device with a flat screen as incoming water flow is not deflected against the curvature of a rounded screen. Later CPS devices became vertical screens of different shaped and sizes. Some were still flat, some were round, oval, L shaped, Z shaped, etc. The use of grated screens of any shape and varied materials are well-known in the art and have been integrated into storm water treatment systems for decades. Most of the designs use a perforated stainless steel screen mounted or welded to a frame of either solid flat bar or L metal to give the system strength and rigidity.

Generally, these CPS devices had to be low in cost to allow for widespread implementation. Commonly cities would issue project bids for several hundred devices at a time to be installed. Another challenge was how quickly these devices were required to be retrofitted into existing basins. The access into an already installed catch basin was typically at the curb opening face and through a standard 24-inch diameter manhole opening. A CPS device would have to fit through the narrow, existing openings as a singular unit; or have pieces which could fit through the catch basin opening. Once inserted, assembly was completed manually with screws, bolts and other mounting hardware and via welding.

To keep costs down some companies tried to minimize or eliminate the amount of framing material used. As the market became more competitive, the strength and performance of the CPS devices deteriorated, leading to structural failures due, in part, to the minimal framing material installed.

Another problem is that over time and between maintenance cleanings to empty the captured trash and debris, the CPS screen perforations common in the art can become obstructed and clogged by leaves and trash such as plastic bags. This blockage causes the water level behind the screen to build up to the top of the screen where trash and debris can override the designed purpose of the screen, flowing directly into a catch basin even during storms with low flows. Also, the weight of this water pressure can exert several hundred pounds of force. If the CPS device cannot handle the weight, the screen will likely collapse.

To address this problem, the County of Los Angeles implemented a new design requirement. The requirement was that the CPS device would need to be load tested and would have to withstand 60 pounds of force which the county representatives felt was sufficient for the majority of installations. Various commercial companies worked on designs which could meet the requirement without adding costs. There quickly became a need for an innovative design which could achieve the following. First, meet and exceed the 60-pound requirement. Second, meet this requirement while keeping costs down. Third, be modular in design so all the pieces could fit through the manhole opening. Fourth, have a removal middle section so city crews could still have easy access the CPS device to clean the pipes when needed.

SUMMARY

The invention provides an exemplary method, system, and apparatuses depicted, in one of its many embodiments, as an improved, frameless CPS device. The present invention accomplishes the above listed performance objectives using a novel modular design and construction. The preferred embodiment utilizes perforated stainless steel, preferably in thin, long sections and can be either originally sourced material or scrap metal. Other materials can be substituted for stainless steel without materially altering the design and function of the present invention and have been contemplated by the author prior to the filing of this application.

Reinforcement of the CPS device as taught herein is achieved by using perforated stainless steel bent, rolled, or molded into L shapes, wherein the L shapes serve as connection sites, affixing the modular screens end-to-end resulting in a generally curved, frameless CPS device. The reinforced curved ends can withstand the typical regulatory requirement of 60 pounds of force water and debris force. In fact, because of cross supports in combination with the use of curved screens, the present invention unexpectedly has been tested to withstand up to 220 pounds of force. This design can significantly increase the durability of a CPS screen.

DETAILED DESCRIPTION

A preferred embodiment presents a CPS device, herein after "modular connector pipe screen device 18" designed to capture trash and debris in a storm water infrastructure system, such as a catch basin. The frameless, modular connector pipe screen device 18 as presented offers enhanced strength, dependability, and low cost due to its design utilizing a singular material and the assembly of modular elements without the use of a frame. This design improves the ease of installation and maintenance. Modules can be assembled into various shapes and sizes to meet the size, space and shape restrictions of locations and anticipated storm water flow rates where the devices are being installed.

The frameless modular connector pipe screen device 18 can be installed at various depths and at various heights. The modular connector pipe screen device 18 can be located above the ground surface and placed water run-off areas of parking lots, landscape areas, and streets and can be designed to handle site specific, anticipated storm water flow rate conditions. The modular connector pipe screen device 18 can also be installed completely underground within a storm water system, such as a catch basin. The height of the modular connector pipe screen device 18 can be from a few inches to over a dozen feet in height.

The screen perforations sizing and spatial arrangement are designed to meet current regulation requirements while maximizing flow and minimizing the amount of smaller debris leaving the screen. The round hole diameter can range from 1.0 mm to 20.0 mm and the spatial void arrangement of the perforated holes can range from 25 to 75 percent.

Figure 1:
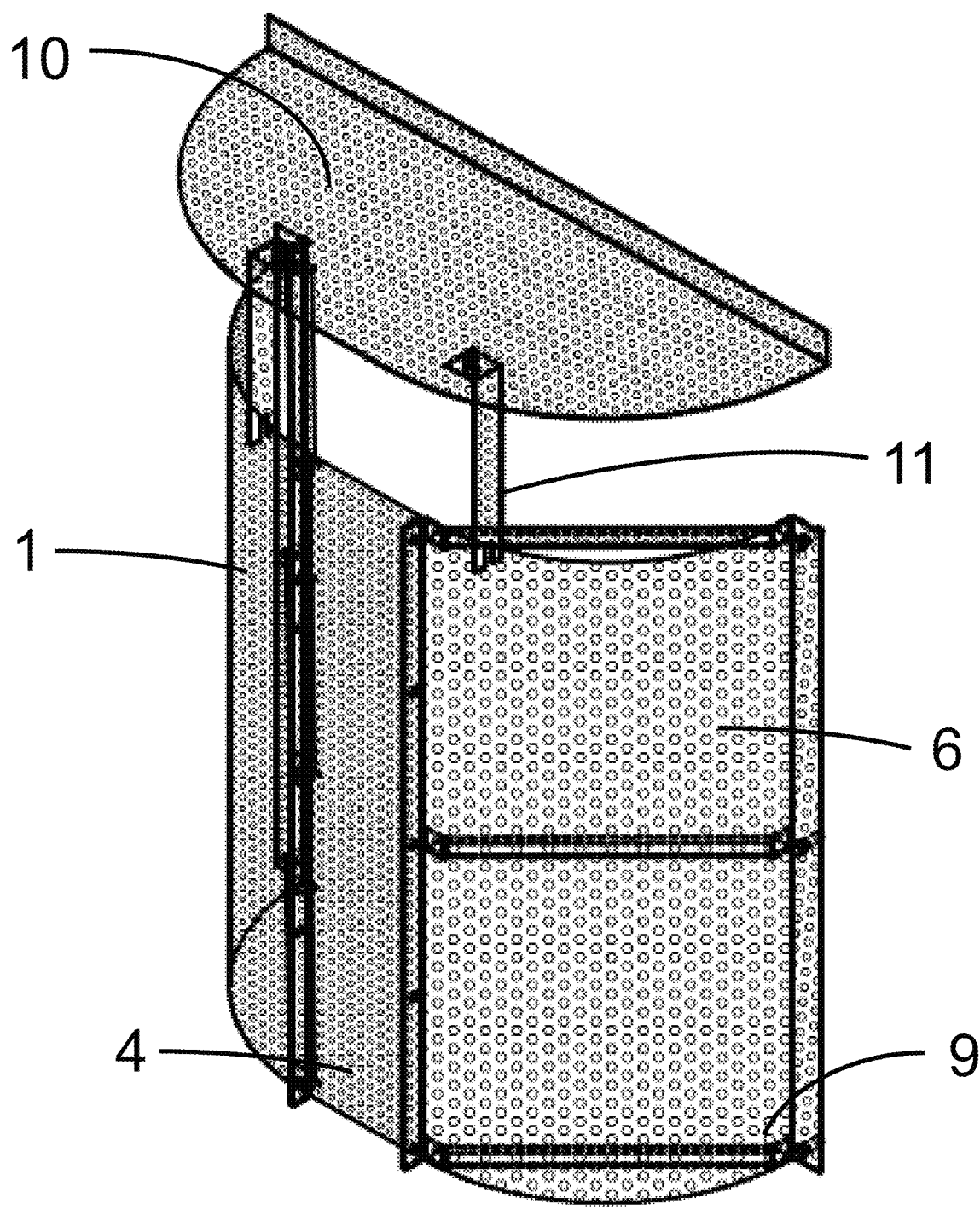
FIG. 1 represents a perspective, front iso view of a nearly assembled, rounded connector pipe screen, in accordance with one embodiment.

FIG. 1 begins to illustrate an example of a modular connector pipe screen device 18 which is generally rounded in a C-shaped configuration. This shape deflects the flow of incoming storm water and decreases the circumstances in which a CPS device collapses as is commonly experienced in CPS devices with rectangular and flattened screens. In one embodiment, FIG. 1 depicts separate elements of the modular connector pipe screen device 18, including a top screen 10, top screen support legs 11, left end rounded screen 1, a middle straight screen 4 which can be flat, and a right end rounded screen 6, and a cross support 9. Additional screens (1, 4, and 6) can be added to the modular connector pipe screen device 18 to increase the width of the overall screen assembly. The concave portion of the screen assembly of FIG. 1 mounts against a storm drain outlet (not shown here but seen in FIG. 8). Although FIGS. 1-8 show the modular connector pipe screen device 18 as a generally curved shape, the basic shape could vary, including but not limited to a square shape. As an example, the left, 1, and right end, 6, screens could be assembled at 90 angles to the middle straight screen 4.

Figure 2:
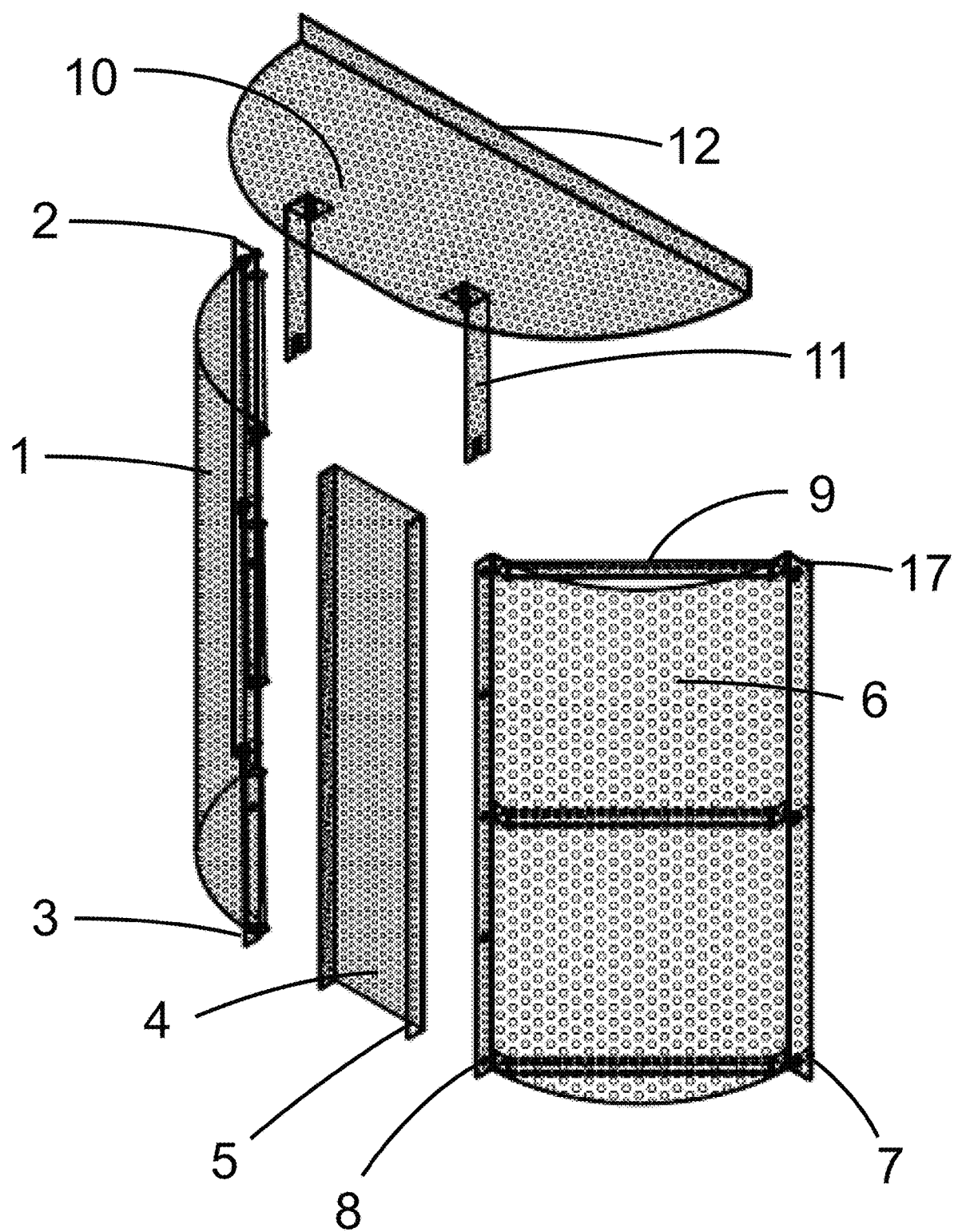
FIG. 2 represents a perspective, exploded iso of the elements of a rounded connector pipe screen with most elements unassembled, in accordance with one embodiment.

FIG. 2 illustrates an unassembled, rounded embodiment of modular connector pipe screen device 18, particularly pointing out a series of flanges. The top screen 10 includes top screen support legs 11 and a top screen mounting flange 12. The top screen mounting flange 12 increases the overall strength of the modular connector pipe screen device 18 by mounting to a side wall of storm drain outlets or infrastructure. The left end rounded screen 1 also includes one or more left end rounded screen mounting flange(s) 2 and one or more left end rounded screen connection flange(s) 3. The middle straight screen 4 also includes one or more middle straight screen connection flange(s) 5. The right end rounded screen 6 includes one or more cross supports 9, one or more mounting pins 17, one or more right end rounded screen mounting flange(s) 7 and one or more right end rounded screen connection flange(s) 8.

Flanges as described herein are used to either connect the modular pieces of the modular connector pipe screen device 18 together, for example a right end rounded screen connection flange 8, or for mounting the screen to storm drain infrastructure and/or a storm drain outlet. The use of flanges increases the structural strength of the modular connector pipe screen device 18 presented herein as they eliminate the need of assembling the screen elements onto a structural frame. The flanges are generally flat to provide a flush mounting and/or connecting surface and can be reinforced with gaskets, attachment screws 16, mounting pins 17, and other bolts and other fasteners (none shown here). The flanges are not separate pieces of the screens, rather, they are constructed by bending, rolling, or otherwise manipulating the ends of the screens at a 90-degree angle from each end curved surface of a screen and extending vertically. Flanges can extend the full height of the end piece or portion of a screen.

Figure 3:
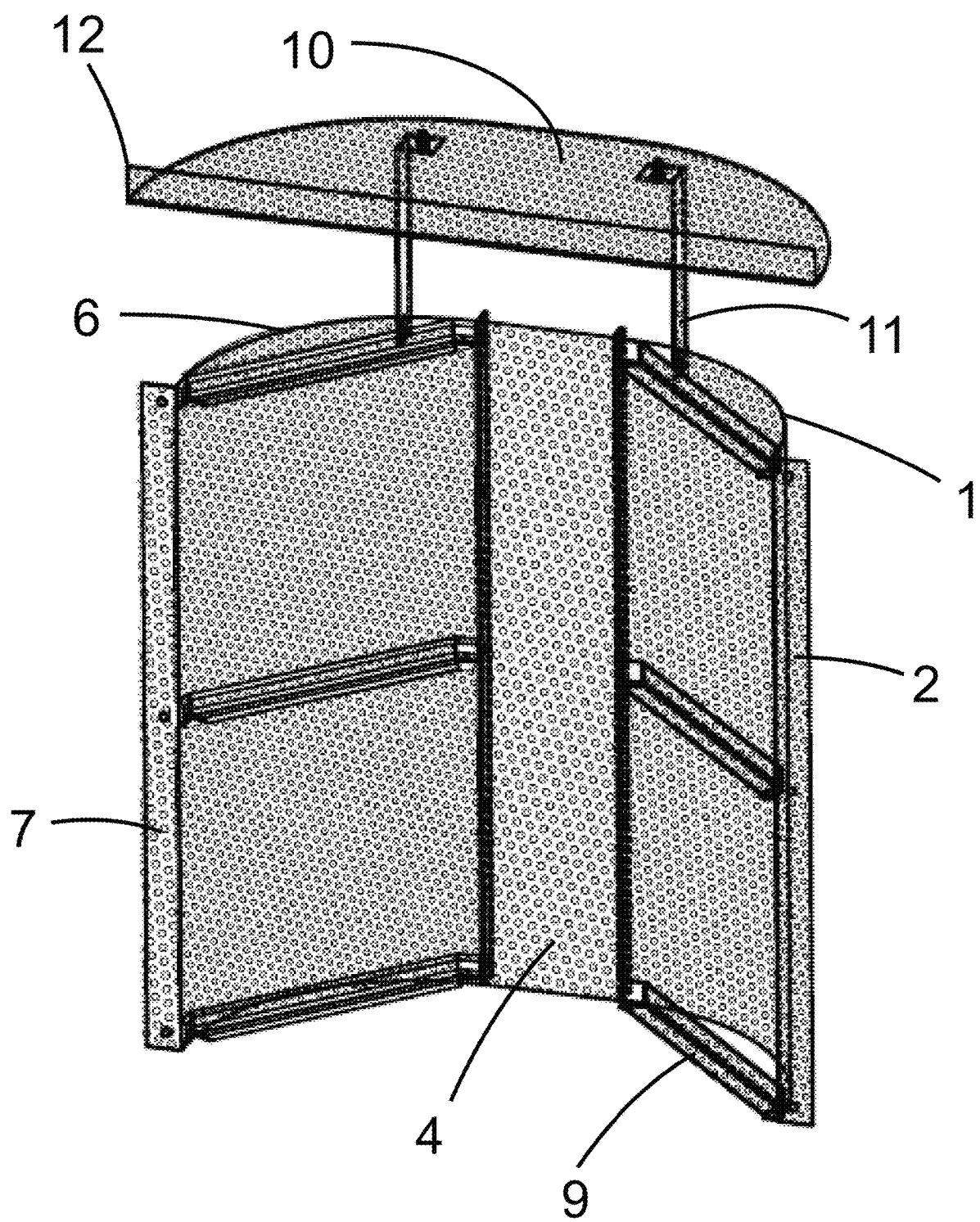
FIG. 3 represents a perspective, rear iso view of a nearly assembled, rounded connector pipe screen, in accordance with one embodiment.

FIG. 3 presents a perspective, rear iso view of an embodiment of the modular connector pipe screen device 18 and better illustrates the concave design of a rounded modular connector pipe screen device 18. The flanges are easily seen in FIG. 3, including a right end rounded screen mounting flange 7 a top screen mounting flange 12, and a left end rounded screen mounting flange 2. FIG. 3 shows a top screen 10 with, in this embodiment, two top screen support legs 11 and no bottom screen. Also depicted is a right end rounded screen 7 affixed to a middle straight screen 4, which in turn is affixed to a left end rounded screen 1. The screens include cross supports 9 placed to reinforce the modular connector pipe screen device 18 without detrimentally impeding water flow through the perforations of the screens.

Figure 4:
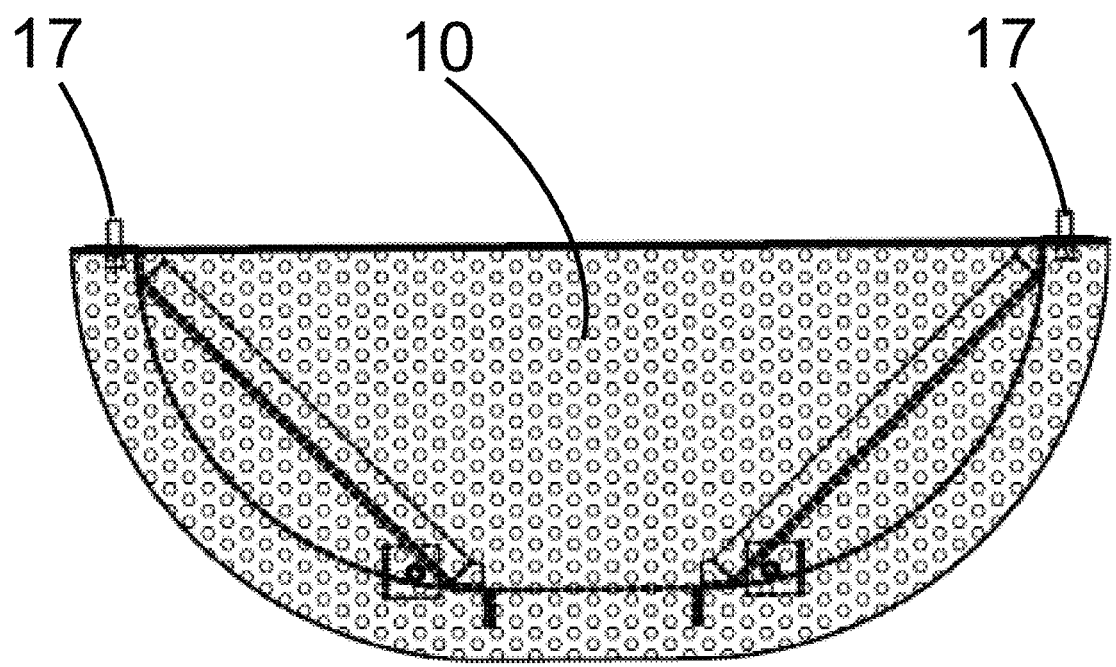
FIG. 4 represents a top view of the top screen, in accordance with one embodiment.

FIG. 4 illustrates a top screen 10 with mounting pins 17, in accordance with one embodiment.

Figure 5:
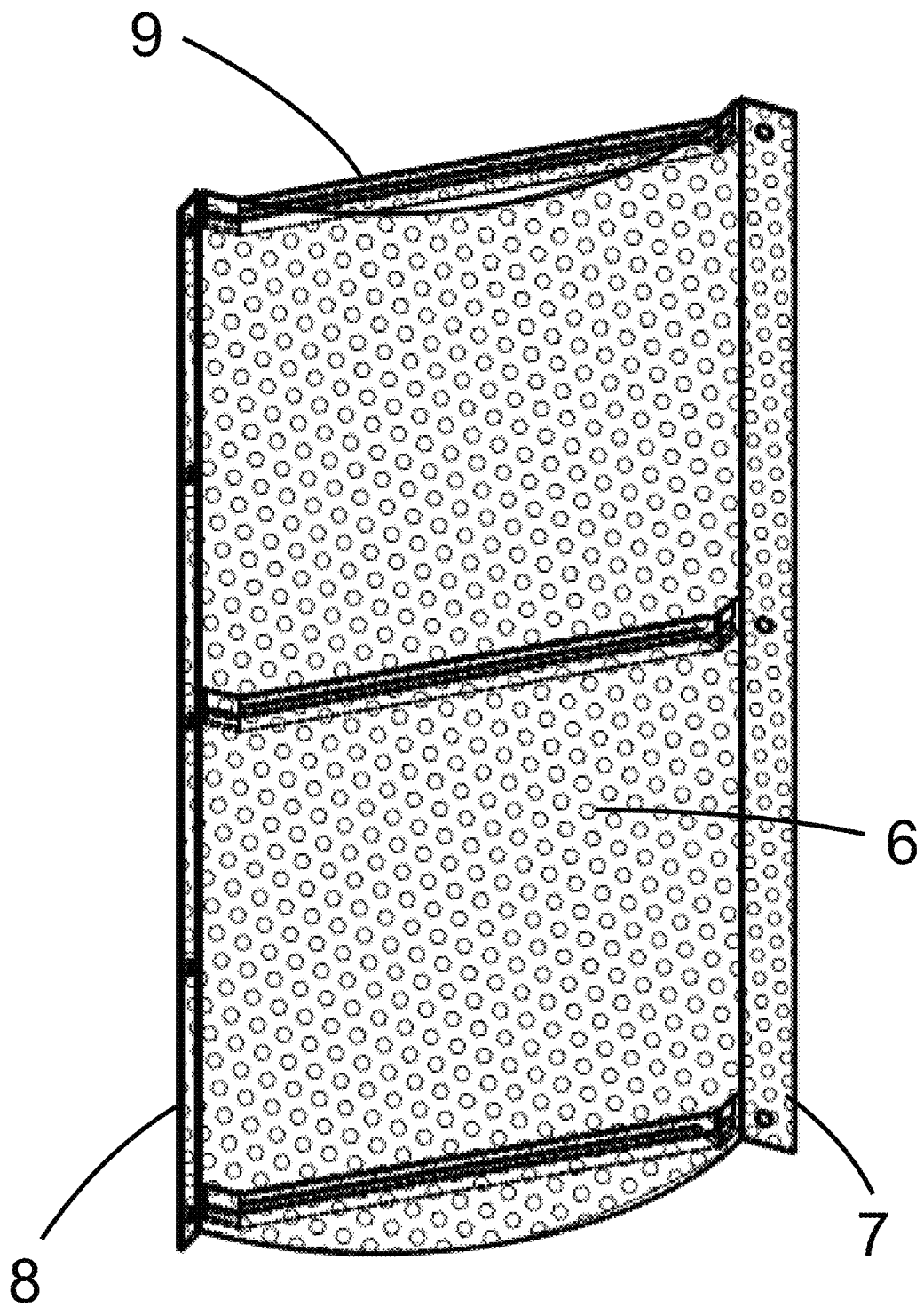
FIG. 5 represents an isometric view of a right end rounded screen 6, in accordance with one embodiment.

FIG. 5 presents an isolated view of a right end rounded screen with both a right end rounded screen mounting flange 7 and a right end rounded screen connection flange 8 and cross supports 9. As with flanges, cross supports 9 are not part of a frame assembly or independent pieces but are bent L shaped segments of a screen.

Figure 6:
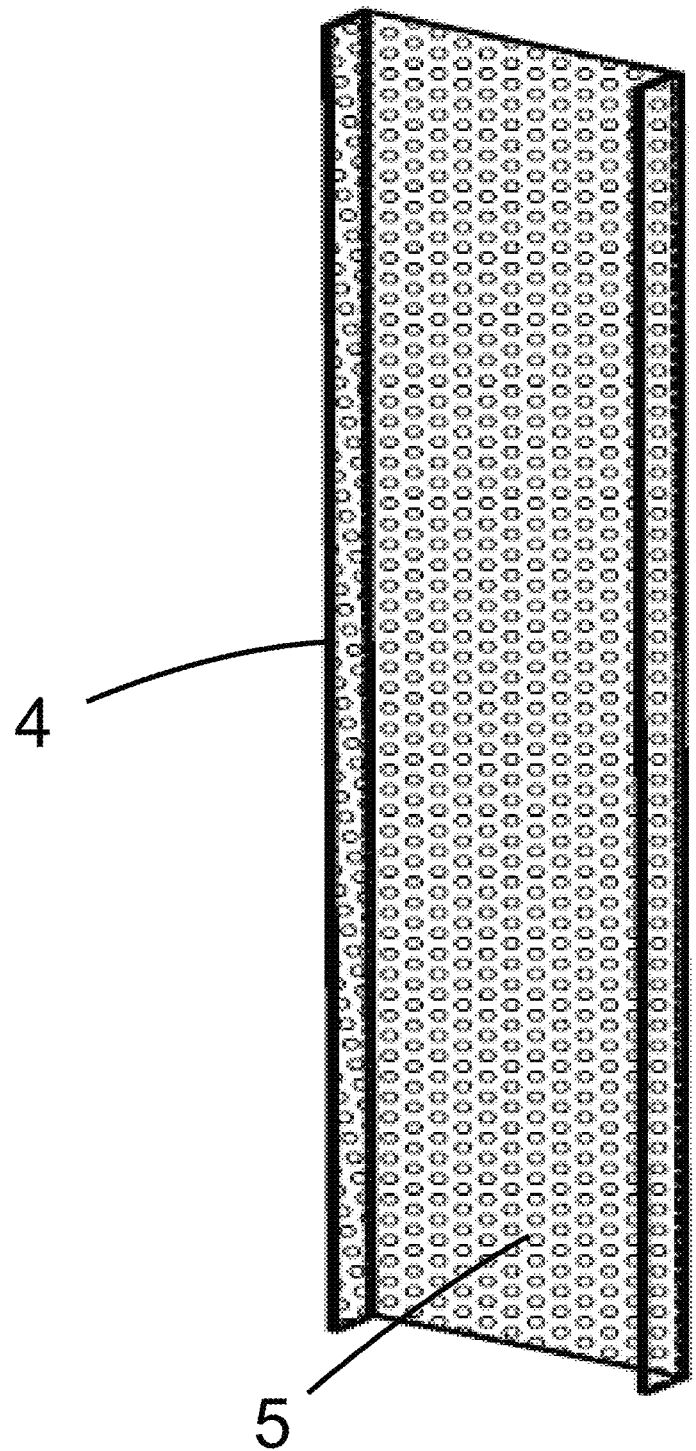
FIG. 6 represents an isometric view of a middle straight screen 4, in accordance with one embodiment.

FIG. 6 provides an isolation view of a middle straight screen 4 with two middle straight screen connection flanges 5 on the side edges of the middle straight screen 4. Several middle straight screens 4 maybe assembled to each other to create a larger modular connector pipe screen device 18.

Figure 7:
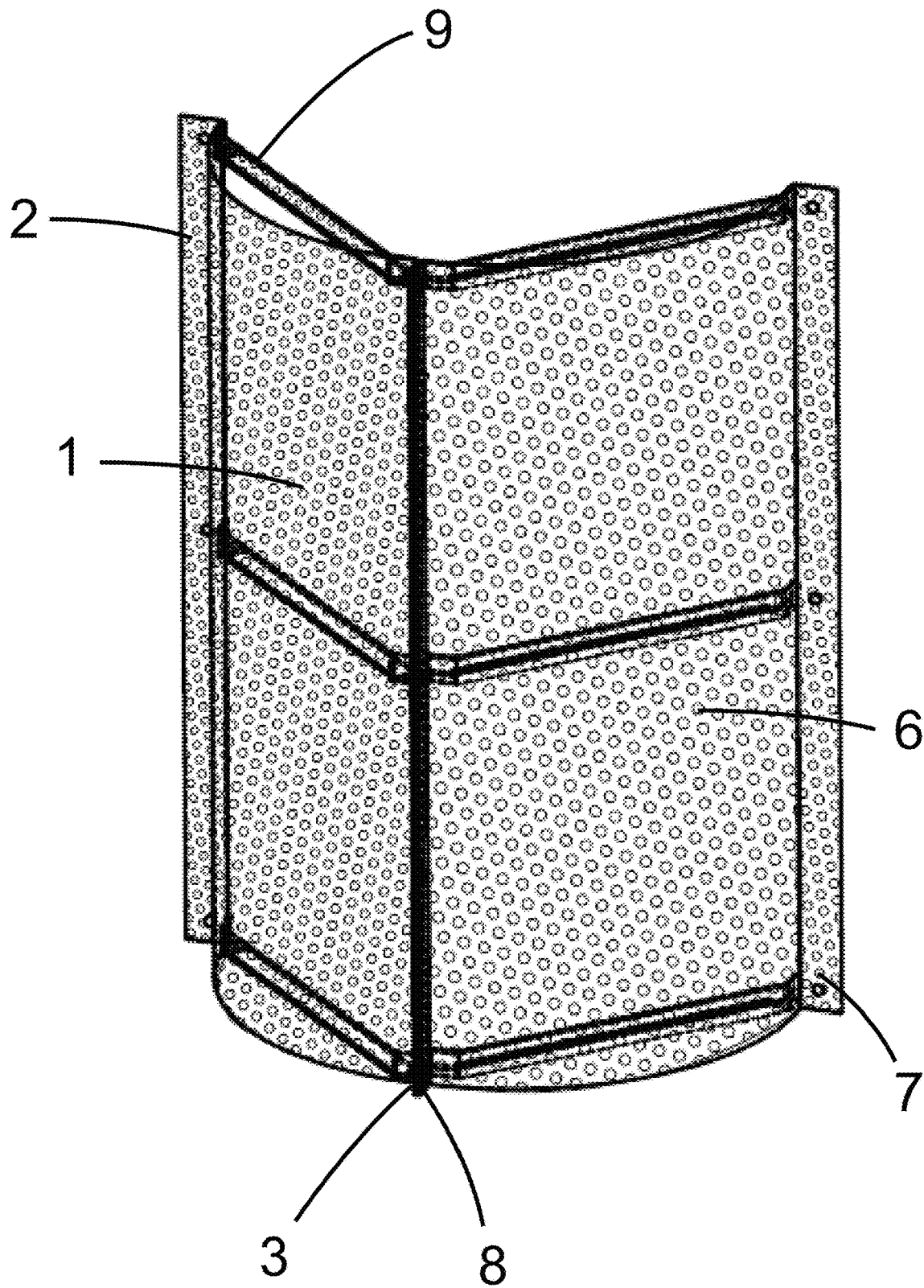
FIG. 7 represents a perspective, isometric of a left end rounded screen 1, connected to a right end rounded screen 6, in accordance with one embodiment.

FIG. 7 demonstrates the various elements of the dorsal side of a left end rounded screen 1, including cross supports 9, left end rounded screen mounting flanges 2, a left end rounded screen connection flange 3 running along the midline of the left end rounded screen 1, and also depicts a mounting flange 7 and a connection flange 8.

Figure 8:
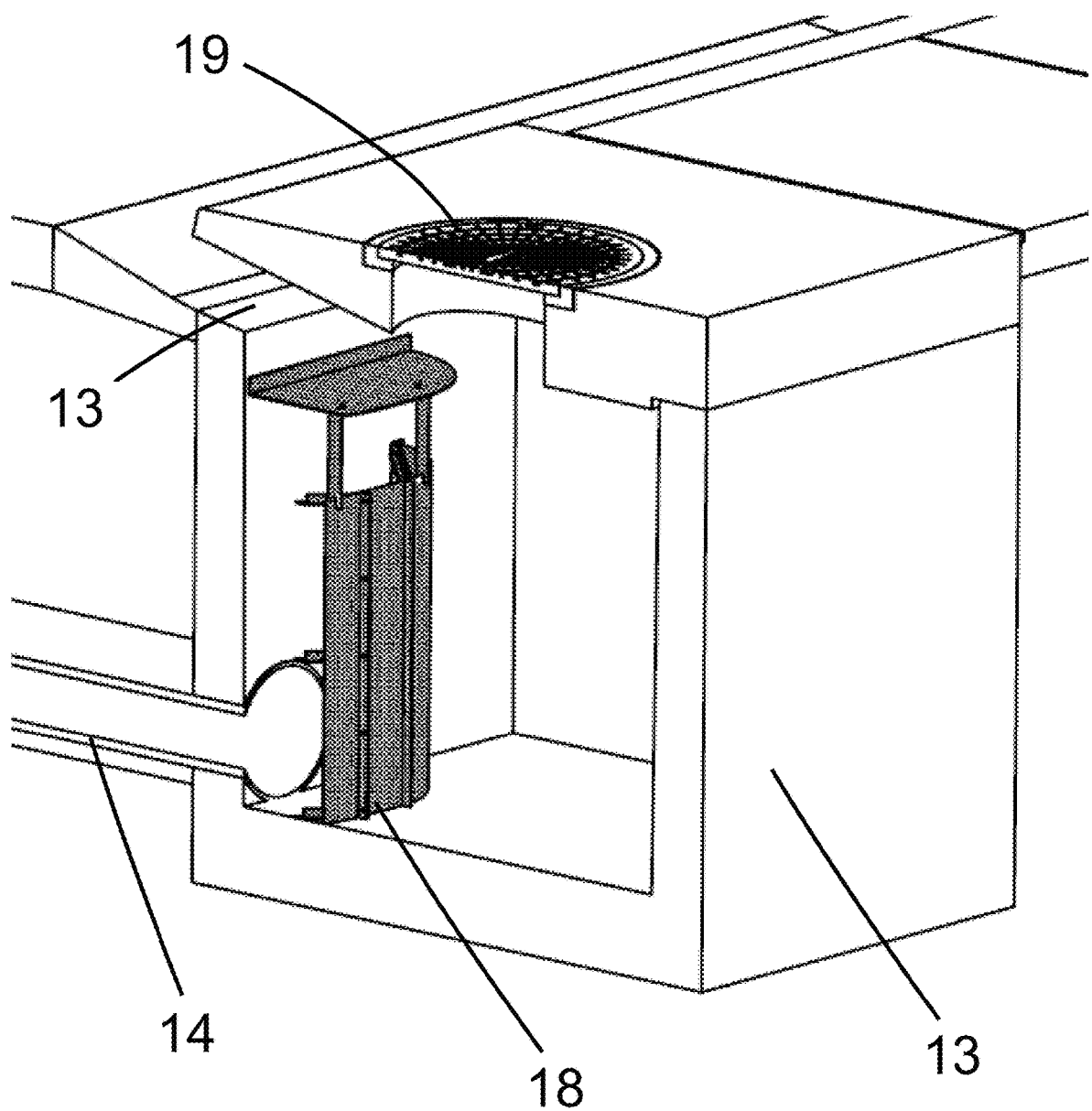
FIG. 8 represents a perspective view of a connector pipe screen installed within storm drain infrastructure, in accordance with one embodiment.

FIG. 8, in accordance with one embodiment, presents the modular connector pipe screen device 18 mounted within a subterranean catch basin 13 in proximity of an outlet pipe 14 and can be installed and accessed via a manhole cover 19. The modular connector pipe screen device 18 as shown here is open on one side to demonstrate where the water flows from the outlet pipe 14 to the modular connector pipe screen device 18. In a normal installation, the arrangement of the side end screens (1 and 6) would be flush against the walls of storm water infrastructure to prevent trash and debris from moving outside of the modular connector pipe screen device 18. The modular connector pipe screen device 18 may be installed at varying distances from the side walls of storm water infrastructure and an outlet pipe 14 to adjust the flow rate of treated water moving through storm water infrastructure to accommodate for anticipated low and medium storm water flow rates at a particular site. Occasional maintenance is required to remove collected trash and debris from the modular connector pipe screen device 18. Maintenance can easily be completed by removing and then replacing the middle straight screen 4.

Figure 9:
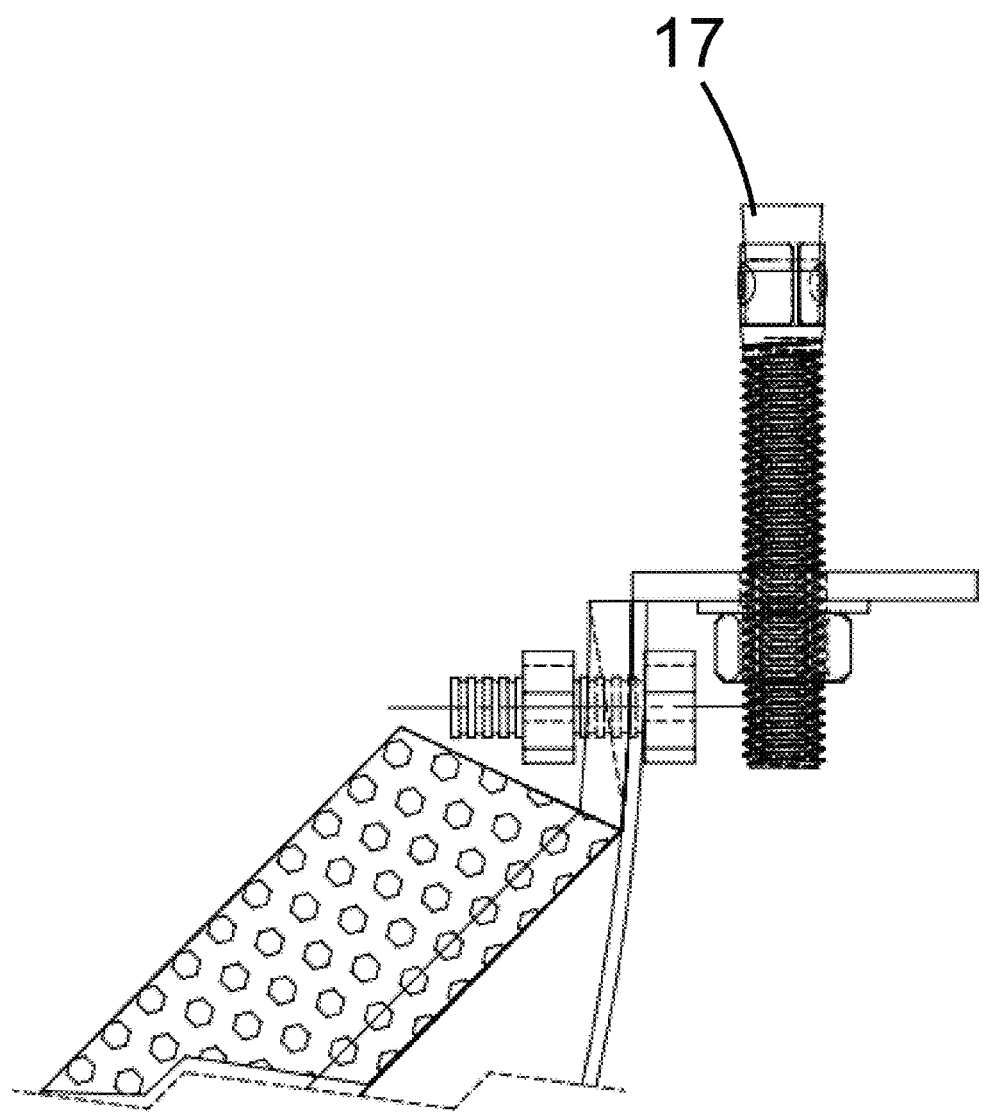
FIG. 9 represents a top view of a mounting pipe 7 as part of the connector pipe assembly, in accordance with one embodiment.

FIG. 9 presents an example of a screen fastener, in this case, a mounting pin 17. Other fastening mechanisms may be used, including screws and welding.

I claim:

1. A modular connector pipe screen device for insertion into a stormwater catch basin,
    wherein the modular connector pipe screen device is mounted to two adjacent walls of the catch basin and is positioned to span across the outlet pipe of the catch basin to prevent debris from entering the pipe during low to moderate flow conditions, said modular connector pipe screen device is made of two end pieces and one middle piece,
    wherein said end piece has a curved surface with two flanges bent at a 90-degree angle from each end curved surface and extending vertically the full height of the end piece,
    wherein said end piece is made of perforated stainless steel with round holes with a diameter of 1.0 mm to 20.0 mm in size, said void area of perforated stainless steel from 25% to 75%, wherein said end piece is supported by one or more cross supports running horizontally from one of the curved surface to opposite end of the curved surface,
    wherein said cross support is bent into an L shape and is made of perforated stainless steel with round holes with a diameter of 1.0 mm to 20.0 mm in size, said void area of perforated stainless steel from 25% to 75%, wherein said side pieces with said cross supports each having an end securely mounted to the wall of the catch basin,
    wherein said securely mounted side pieces, on the ends not attached to the catch basin wall, connected together by a middle piece, wherein said middle pieces is has a flat surface with two flanges bent at a 90 degree angle from each end of the flat surface and extending vertically the full height of the middle piece,
    wherein the said middle piece is made of perforated stainless steel with round holes with a diameter of 1.0 mm to 20.0 mm in size, said void area of perforated stainless steel from 25% to 75%, wherein said end and middle pieces connected together with mounting pins.

2. A modular connector pipe screen device of claim 1, wherein a top cover is above the screen, said top cover made of perforated stainless steel with round holes with a diameter of 1.0 mm to 20.0 mm in size, said void area of perforated stainless steel from 25% to 75%, said top cover spaced above the trash screen using one or more legs made of perforated stainless steel with round holes with a diameter of 1.0 mm to 20.0 mm in size.

3. A modular connector pipe screen device of claim 1, wherein said screen is mounted to the walls of the catch basin wherein the walls of the catch basin are concrete and the screen is mounted with mounting pins imbedded into the concrete.

4. A modular connector pipe screen device of claim 1, designed to be installed in storm water structures located above or partial above ground.

5. A modular connector pipe screen device of claim 1, wherein stainless steel is scrap metal.

6. A modular connector pipe screen device for insertion into a stormwater catch basin,
    wherein the screen is mounted to the wall of the catch basin and is positioned to span across the outlet pipe of the catch basin to prevent debris from entering the pipe during low to moderate flow conditions, said modular connector pipe screen made of two end pieces and one middle piece, wherein said end piece has a curved surface with two flanges bent at a 90 degree angle from each end curved surface and extending vertically the full height of the end piece, wherein the said end piece is made of perforated stainless steel with round holes with a diameter of 1.0 mm to 20.0 mm in size, said void area of perforated stainless steel from 25% to 75%, wherein said end piece is supported by one or more cross supports running horizontally from one of the curved surface to opposite end of the curved surface, wherein said cross support is bent into an L shape and is made of perforated stainless steel with round holes with a diameter of 1.0 mm to 20.0 mm in size, said void area of perforated stainless steel from 25% to 75%, wherein said side pieces with said cross supports each having an end securely mounted to the wall of the catch basin, wherein said securely mounted side pieces, on the ends not attached to the catch basin wall, connected together by a middle piece, wherein said middle piece has a flat surface with two flanges bent at a 90 degree angle from each end of the flat surface and extending vertically the full height of the middle piece, wherein the said middle piece is made of perforated stainless steel with round holes with a diameter of 1.0 mm to 20.0 mm in size, said void area of perforated stainless steel from 25% to 75%, wherein said end and middle pieces connected together with mounting pins.

7. A modular connector pipe screen device of claim 6, wherein a top cover is above the screen, said top cover made of perforated stainless steel with round holes with a diameter of 1.0 mm to 20.0 mm in size, said void area of perforated stainless steel from 25% to 75%, said top cover spaced above the trash screen using one or more legs made of perforated stainless steel with round holes with a diameter of 1.0 mm to 20.0 mm in size.

8. A modular connector pipe screen device of claim 6, wherein said screen is mounted to the walls of the catch basin wherein the walls of the catch basin are concrete and the screen is mounted with mounting pins imbedded into the concrete.

\* \* \* \* \*